US006138215A

United States Patent [19]

Check et al.

[11] Patent Number: 6,138,215

[45] Date of Patent: Oct. 24, 2000

[54] METHOD FOR ABSOLUTE ADDRESS HISTORY TABLE SYNONYM RESOLUTION

[75] Inventors: Mark Anthony Check, Hopewell Junction; Jane Helen Bartik, Poughkeepsie, both of N.Y.

[73] Assignee: International Business Machines Corporation, Armonk, N.Y.

[21] Appl. No.: 09/070,575

[22] Filed: Apr. 30, 1998

[51] Int. Cl.[7] ..................................................... G06F 12/10

[52] U.S. Cl. ........................... 711/137; 711/221; 711/213

[58] Field of Search ................................... 711/216, 221, 711/3, 137, 213

[56] References Cited

U.S. PATENT DOCUMENTS 5,148,538 9/1992 Celtruda et al. .

OTHER PUBLICATIONS

"A High–Frequency Custom CMOS S/390 Microprocessor" by Webb et al., IBM Journal of Research and Development, vol. 41, No. 4/5, Jul./Sep. 1997, pp. 463–473.

"Effecting A One–Cycle Cache Access In A Pipeline Having Combined D/A Using A BLAT" IBM Technical Disclosure Bulletin, vol. 31, No. 8, Jan. 1989, by Rechtschaffen et al., pp. 12–13.

"Mechanism For Acceleration Of Cache References" by Pomerene et al., IBM Technical Disclosure Bulletin, vol. 25, No. 3B, Aug. 1982, pp. 1740–1745.

IBM Technical Disclosure Bulletin, vol. 36, No. 1, Jan. 1993, entitled Handling Address Generate Interlocked Distribution Without Message Delay, pp. 335–337.

*Primary Examiner*—Eddie P. Chan
*Assistant Examiner*—Kevin Verbrugge
*Attorney, Agent, or Firm*—Lynn L. Augspurger

[57] ABSTRACT

A computer processor that uses an AAHT to provide a guess at the real (absolute) address bits used to access the cache and directories that is more accurate in a high-frequency design which prevents any sort of full or large partial adds of ranges of base, index, or displacement has two index values generated and two AAHT arrays, one each for instruction and operand logical requests. It handles cases in which the data is not directly from the GPR array. For designs that aim at improving performance data for some operations that update GPR's may be used for address generation prior to the execution and write to the GPR array, these include data bypass for Load Address (LA) and Load (L). The system handles instruction fetches, relative branches, other special instruction address instruction fetch requests, and those started as a result of a branch history table (BHT) predicted instruction fetch. A method for AAHT synonym resolution improves the accuracy of the index value for an Absolute Address History Table buffer.

2 Claims, 3 Drawing Sheets

METHOD FOR ABSOLUTE ADDRESS HISTORY TABLE SYNONYM RESOLUTION

CROSS REFERENCE TO RELATED APPLICATIONS

The present application related to the following co-pending patent application filed concurrently herewith and entitled: "AAHT Index Generation for Instruction and Operand cache accesses", filed Apr. 30, 1998, under U.S. Pat. No. 09/070,361.

This co-pending application and the present application are owned by one and the same assignee, International Business Machines Corporation of Armonk, N.Y.

FIELD OF THE INVENTION

This invention is related to computers and computer systems and in particular to a computer system with AAHT (Absolute Address History Table) arrays to predict proper values for both instruction and operand cache accesses.

BACKGROUND OF THE INVENTION

In a processor that has a cache system in which the directory and the cache arrays are referenced by means of a real (absolute) address and in which the combination of the cache size, line size, and number of sets in the directory require the number of congruence classes to require address bits to access the directory and and cache that are subject to translation there exists the synonym problem. This occurs because at the time the access of the cache information takes place the upper bits of the real (absolute) are not yet available from translation. For performance considerations of the processor it is not acceptable to wait until the results of the translation, even with a translation lookaside buffer (TLB), are complete to start the cache data access.

IBM's ESA/390 system at the G4 (Generation 4) level was commercially available in 1997. This processor has 64K of cache, with a line size of 128 bytes and a 4-way set associative directory. This results in the cache holding 512 lines. Being a 4-way set associative directory required 128 congruence classes in the cache. The S/390 architecture has a 4K page size. With a 128 byte line size the least significant 7 bits are used to index into the line. With having 128 congruence classes 7 bits are required to access the cache directory and data arrays. With the 4K page size only the least significant 12 bits do not require translation. However with a total of 14 bits required to access the data the 2 most significant bits of the address to access the data require translation, giving a total of four possible congruence classes to access, each with 4 line entries. Thus the comparison to determine if the line was in the cache must occur 16 times. As the number of compares increases the effect on cycle time is negative. Thus a strong desire to keep the number of compares to a minimum. If the cache were 256K with 256 byte lines with the same 4-way set associative directory there would be 1K lines with 256 congruence classes. With 8 bits being required for the index in the line and 8 bits to access the congruence class there are now 4 bits of the address that are subject to translation. This gives 16 possible congruence classes that the line may be, which yields 64 comparisons. This is a problem in a processor design with high frequency operation goals.

A proposed solution to this problem is to predict the correct values of the address bits that require translation. This has been purposed in a number of references and processor designs. In U.S. Pat. No. 5,148,538 "Translation Look Ahead Based Cache Access", IBM TDB 8-82 "Mechanism for Acceleration of Cache References", and IBM TDB 1-89 "Effecting a One-cycle Cache Access in a Pipeline Having Combined D/A Using a BLAT", and in the G4 processor design as described in IBM Journal of Research and Development, vol 41, no 4/5 "A High-frequency Custom CMOS S/390 Microprocessor".

In "Mechanism for Acceleration of Cache References" a scheme is used that uses the base register number and the results of the value of an addition of bits of the displacement field and bits of the base register to predict the line number that is desired to be referenced. It also indicates that if the base register number is zero then use the index register number and bits. This scheme does not deal with cases in which both the base and index registers are used to calculate the operand address. In "Effecting a One-cycle Cache Access in a Pipeline Having Combined D/A Using a BLAT" a 16 entry table is used to convert a base register number to bits of the real (absolute) address that is the value of the address the last time that base register number was used to reference storage. It does not deal with use an index register or possible effects of large displacements. In "Translation Look Ahead Based Cache Access" demonstrates a method that uses a range of bits from the base register to index a table to provide a guess based on prior references what the real (absolute) address bits will be for the line referenced by that value in the base register. Again it does not deal with possible effects of index or displacement values. In the S/390 Generation 4 processor as described in "A High-frequency Custom CMOS S/390 Microprocessor" there was a new structure called the Absolute Address History Table (AAHT) was introduced. It used bits 12 to 19 of the selected base register when the base register number was non-zero or bits 12 to 19 of the selected index register when the base register number was zero to index a 256 entry table that related these partial register addresses to two bits of real (absolute) addresses. With predicting only two bits even when the table lookup was for the wrong entry there was still a 25% chance of getting the correct guess. These bits were then used to access the data directory and arrays. This was done for the operand data accesses. For instruction accesses there were four instruction request addresses. The cache would remember the real (absolute) address bits for each one. When new requests were made an indication would be given as to which of the four values should be used. Instruction requests are generally the same line access as the current fetching stream thus this will generally provide correct results.

SUMMARY OF THE INVENTION

The invention is to have a computer processor that uses an AAHT to provide a guess at the real (absolute) address bits used to access the cache and directories that is more accurate. The mechanism must be able to be determined in the confines of a high-frequency design which prevents any sort of full or large partial adds of ranges of base, index, or displacement. There will be two index values generated and two AAHT arrays, one each for instruction and operand logical requests. In the case of operand requests it has been found through performance evaluation that there are cases in which the virtual address is a function of base+index+displacement in which examination of base alone is not sufficient. Thus all three must be considered when providing information on how to form the guess. It must also handle cases in which the data is not directly from the GPR array. In designs that aim at improving performance data for some operations that update GPR's may be used for address generation prior to the execution and write to the GPR array, these include data bypass for Load Address (LA) and Load (L). In addition for instruction fetches not only must the above information be of concern, so must the use of relative branches, other special instruction address instruction fetch requests, and in the new processor design those started as a result of a branch history table (BHT) predicted instruction fetch.

Thus a complex selection and function that will yield the same result for repeated references, of selected fields will be used to provide more accurate prediction of the bits used to access the absolute address history table for these operand and instruction logical requests. This will be done during the decode cycle on the instruction so that the index for the AAHT will be in a latch at the start of the address add (AA) cycle. While the AA is occurring the AAHT index will be used to access the table and provide the required bits of the real (absolute) address that are subject to translation. The accuracy of these bits and thus of the index that is used to obtain the guess from the table becomes more important as the number of bits used to index the array and directory that are subject to translation become larger. In the case that only 2 such bits are needed the possibility that a improper index is used to obtain the guess results in a 25% chance of it still being correct. However at 4 bits the chance of an improper guess being correct is just over 6%, thus a correct guess more important.

These and other improvements are set forth in the following detailed description. For a better understanding of the invention with advantages and features, refer to the description and to the drawings.

(Note: For convenience of illustration, FIGURES may be separated in parts and as a convention we place the top of the FIGURE as the first sheet, with subsequent sheets proceeding down and across when viewing the FIGURE, in the event that multiple sheets are used.)

DETAILED DESCRIPTION OF THE INVENTION

Before considering our preferred embodiments in detail, it may be worthwhile to point out in more detail of the operation of obtaining the index for the AAHT in the ESA/390 Generation 4 machine. For instruction logical requests there were 4 instruction address requestors. When a logical address add for instruction was performed the Buffer Control Element (BCE) (cache) would remember some corresponding real (absolute) page address bits for that requestor since the cache is real (absolute) addressed. The only address increment requests that were generated were repeat requests that would use the same absolute address bits or in cases of true increments, which in most cases the next line was also in the same page, and thus would have the same absolute page address bits. Also for the initial address adder request an arbitrary guess was taken for the two absolute bits used, which was correct 25% of the time. It did not deal with bypass of data in AGI (Address Generate Interlock) cases, relative branches, or deal with new source locations possible with the introduction of the use of a Branch History Table (BHT). For operand logical requests a virtual address page number was used to index an array that mapped page number to real (absolute) address bits to use in dealing with the synonym problem in address translation in the L1 cycle. In this G4 design the operand AAHT index value was the partial page number for the Base Register when used and the page number for the Index Register when Base was not used or was zero. It did not account for cases of AGI bypass data or deal with cases where both Base and Index Registers were used and the effect of using both was to reference a different page. Using incorrect guesses for this index often results in the wrong values being looked up in the L1 cache and as a result the return of operand data will be delayed by two cycles.

Figure 1:
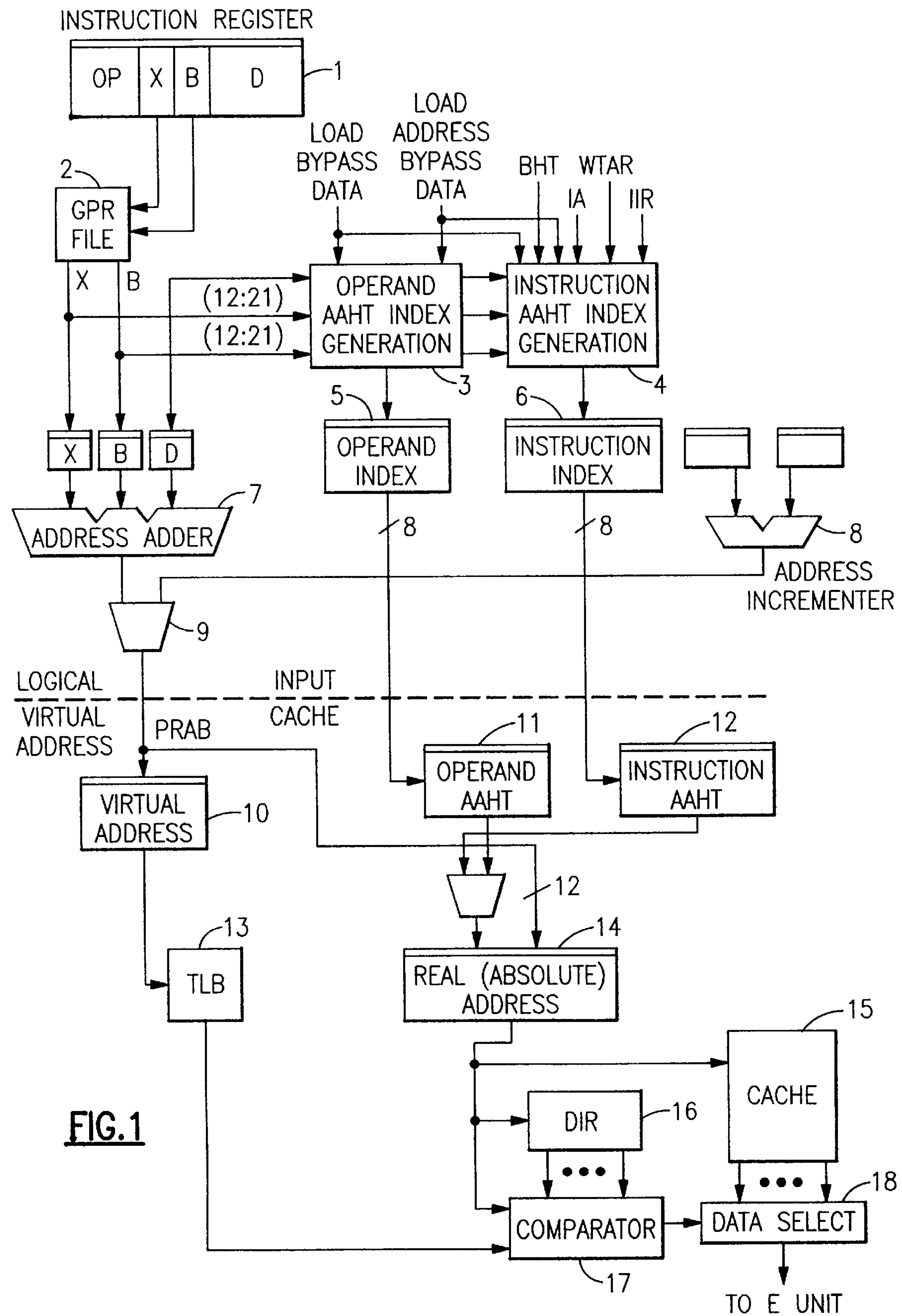
FIG. 1 shows schematically an overview of the preferred embodiment of the determination of the index values to the AAHT's.

The process or method described below has fewer incorrect index values for the AAHT function and improves performance over that of the G4 design. In FIG. 1 the instruction being decoded is held in the instruction register (1). The instruction text includes the base (B) and index (X) register numbers, and a displacement (D) or immediate (Imm) field. The B and X fields are used to read general purpose register (GPR) contents from the register file (2). The results of which go as full ranges to the address adder (AA) (7) where they are latched for the AA function in the next cycle. Subranges also go to the instruction (4) and operand (3) index generation logic. Partial ranges of the D or Imm field also go to this logic. The results of the AAHT index generation are latched in the instruction index register (6) and operand index register (5). For some of the instruction logical requests are initiated from the Address Incrementer (8) for the BHT requests, sequential requests, and branch wrong target (WTAR). The two types logical requests, AA (7) and AI (8) are muxed (9) into a single bus called PRAB (processor request address bus).

Thus the BCE gets the virtual address, which it latches (10), and the two AAHT index values for each logical request. In the cache during the cycle that the virtual address is being calculated in the Iunit the AAHT, operand (11) or instruction (12) AAHT is being referenced. The low order 12 bits and the number of upper bits subject to translation provided from the AAHT is latched (14). During the next cycle the cache array (15), cache directory (16), and translation lookaside buffer (TLB) (13) are accessed. These results are used to compare (17) to determine if the guess of the real (absolute) address was correct, and if the desired line was in the cache. If so the correct data line is selected (18) to be sent back to the processor execution element.

Figure 2:
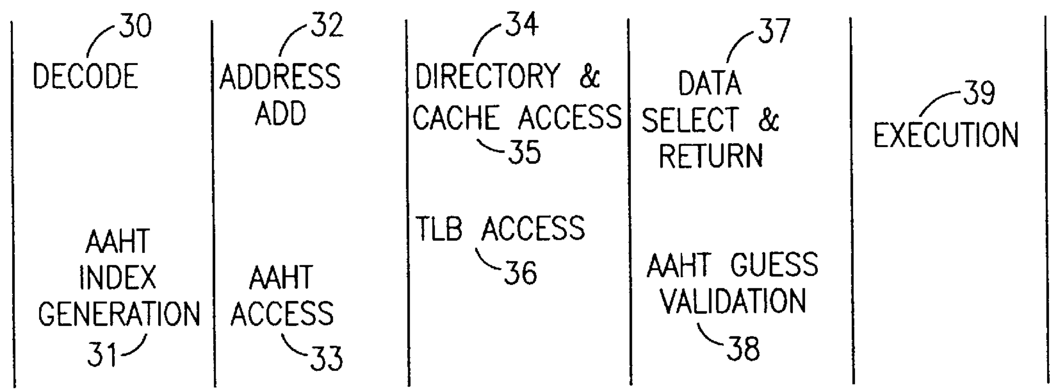
FIG. 2 shows the pipeline stages and when the functions are performed.

In FIG. 2 a description of the pipeline of the in which this function is used to provide information on what activities occur and when. The basic pipeline is for instruction decode (30) to occur in the first cycle. It is also late in this first cycle that the generation of the AAHT index (31) is done. In the second cycle the full virtual address computation (32) is done by the AA or AI. At the same time the access of the AAHT array (33) occurs. The virtual address and guess of the real (absolute) address is used in cycle 3 to access the cache data (33), cache directory (34), and cache TLB (36). In the fourth cycle the data is selected (37) for return and the AAHT address is validated (38). The fifth and final cycle is use of the data by the execution element (39).

Figure 3:
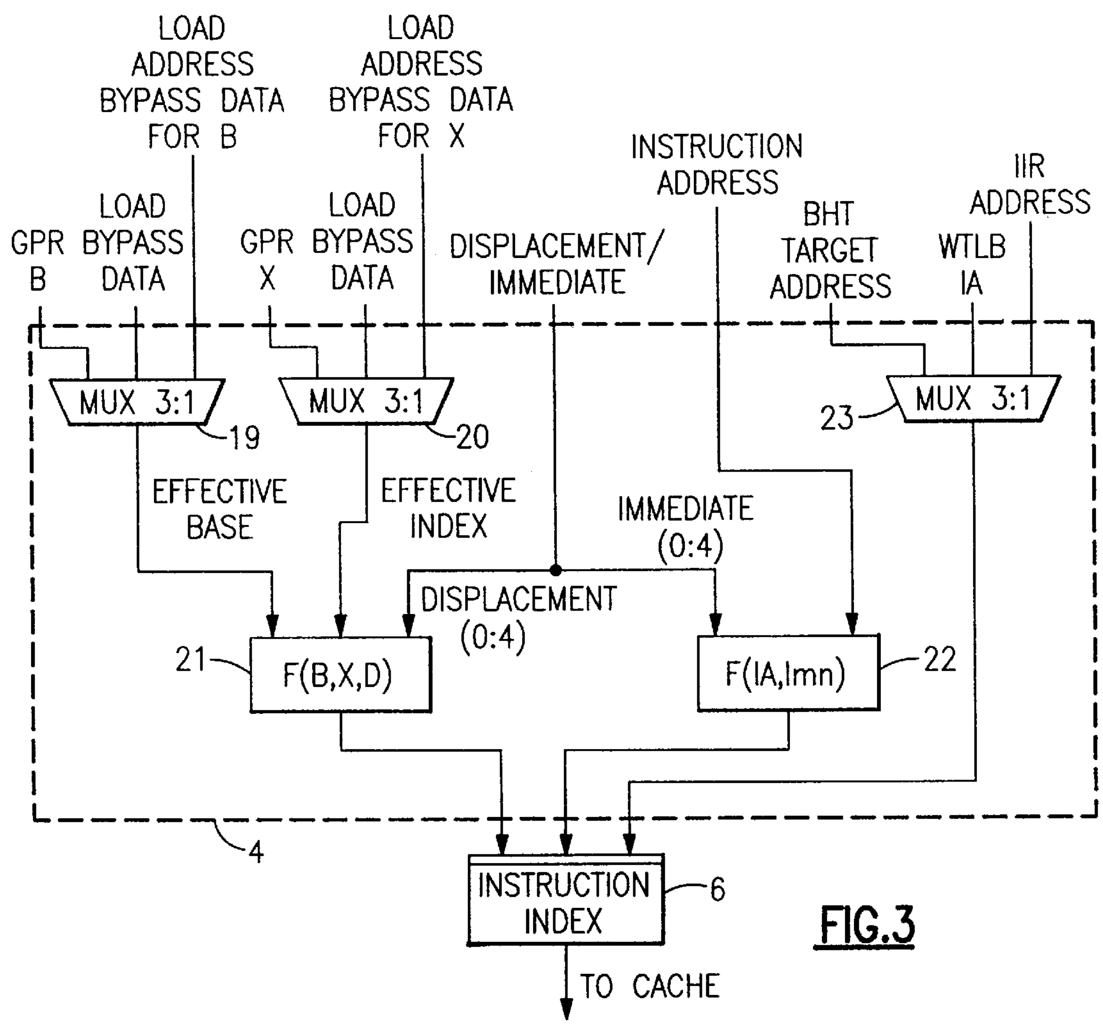
FIG. 3 illustrates the preferred embodiment of the generation of the index value for instruction logical requests to the AAHT.

In FIG. 3 the preferred embodiment is shown for the generation of the instruction request index (4) for the AAHT.

This index must handle properly the cases of B+X+D branches including cases of L or LA bypass of data, relative+ immediate branches, BHT target fetches, branch wrong target fetches, restart from current IA, sequential fetches, and repeat fetches. In cases where branch address is being calculated from B+X+D need to generate a index value that performs a simple function on the B, X, and some bits of D. To handle that cases of data from the GPR array, LA, or L requires a multiplex for B (19) and for X (20) to get the effective B and X. The function (21) uses only bits of the effective B and X to determine the upper seven bits of the index value. For the least significant bit use information from the five most significant bits of D with the bits from B & X. In the case of relative branches the target is the current instruction address (IA) plus an immediate field from the instruction text. For IA restarts it is just the current IA. Thus perform a function (22) on IA and the most significant 6 bits of the immediate field to form the index value. Finally in cases for which the instruction request will originate from the AI, multiplex bits from the possible sources and use this for the Index value. In the cases of BHT and WTAR the increment value is zero, and for request based on sequential or repeat fetch activity it is unlikely to have a carry into the page index. Thus only use the primary input value. Then latch into the instruction index register (6) the correct generated index value.

Figure 4:
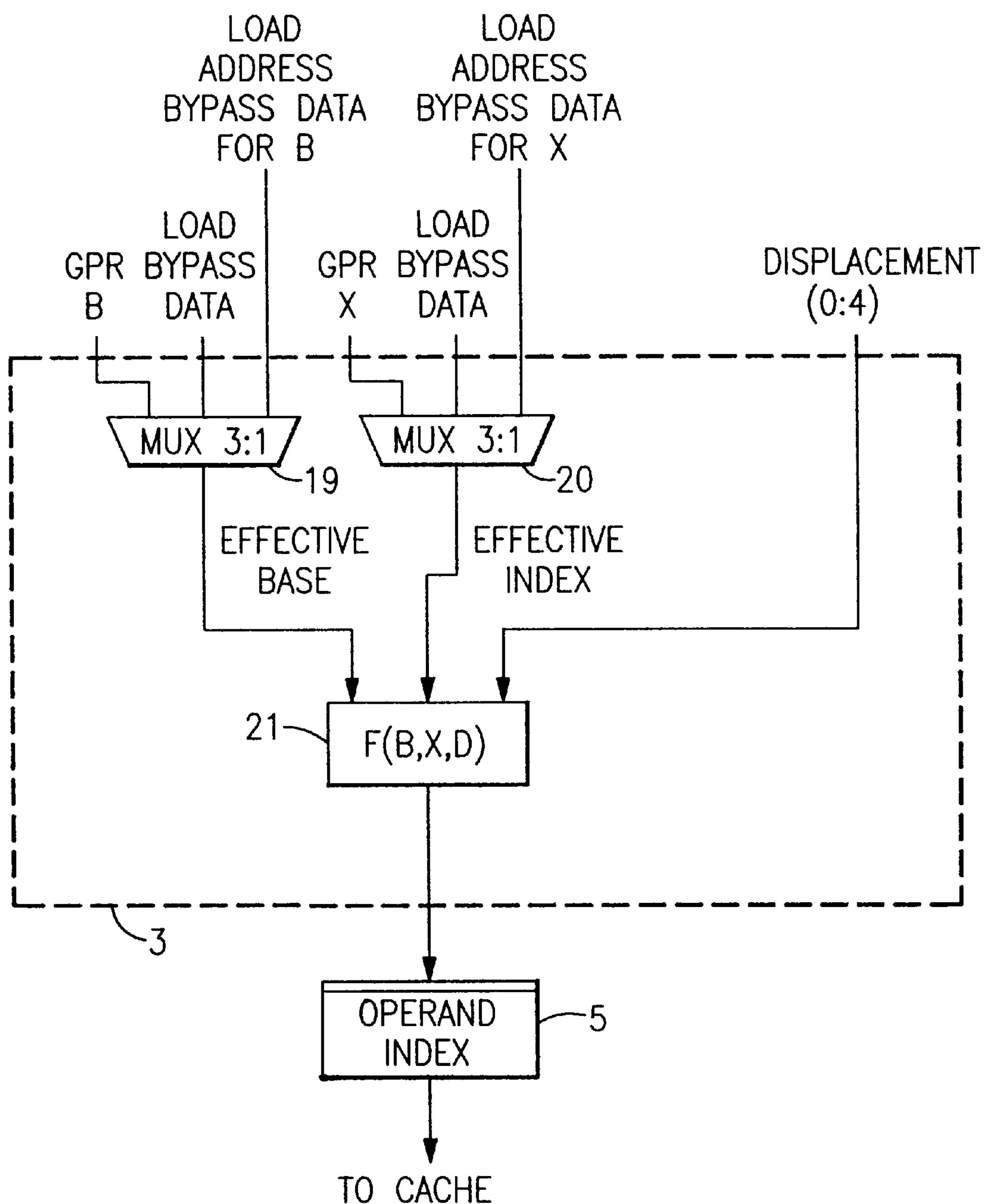
FIG. 4 illustrates the preferred embodiment of the generation of the index value for the operand logical request to the AAHT.

In FIG. 4 the preferred embodiment is shown for the generation of the operand request index (3) value for the AAHT. This index must handle properly the cases of operand address requests in the form of B+X+D, including all cases of L and LA data bypass in addition to the data from the GPR array. Thus first need to multiplex the possible sources of B (19) and of X (20). Take these effective B & X values and perform a function (21) with bits from the D to form the operand index to the AAHT. For the most significant seven bits of the index are only based on bits of B & X, while the least significant bit also examines bits from the five most significant D bits. Latch this in the operand index register (5).

It should be noted that depending on the exact cycle time characteristics choices may need to be made on the number of values that can be brought into these complex mux paths, and how elaborate the the function can be to generate unique results. For the operand index exactness is very important since being wrong adds directly to the length of execution. For the instruction index is some cases where the branch was correctly predicted by the BHT the instruction stream may been obtained prior to the branch being decoded. Also some forms of data bypass are not as common. Thus the design cycle time may require selective removal of non-common paths to meet design objectives. One such possible function for operand index generation on B, X, and D could be index(i)=(B(i+12) xor X(i+12)) or (B(i+13) and X(i+13)) for the most significant 7, i in 0 to 6, and index(7)=(B(19) xor X(19)) or (B(20) and (D(0) or D(1) or (D(2) and D(3) and D(4)))) for the least significant.

While we have described our preferred embodiments of our invention, it will be understood that those skilled in the art, both now and in the future, may make make various improvements and enhancements which fall within the scope of the claims which follow. These claims should be construed to maintain the proper protection for the invention first disclosed.

What is claimed is:

1. A method for AAHT (Absolute Address History Table) synonym resolution for improving the accuracy of the index value for an Absolute Address History Table buffer in a machine having an AAHT (Absolute Address History Table) array and a GPR (General Purpose Register) register array, comprising the steps of:

when an AGI (Address Generate Interlock) occurs and has bypass data, using the bypass data instead of base and index contents of the GPR (General Purpose Register) register array for AAHT (Absolute Address History Table) index generation, and when an AGI (Address Generate Interlock) does not occur, using a hash function on base and index contents of the GPR (General Purpose Register) register array.

2. A method for AAHT (Absolute Address History Table) synonym resolution according to claim 1 wherein in addition to using said hash function, the contents of the base and index and displacement are added.

* * * * *